(12) United States Patent
Dip (10) Patent No.: US 7,415,939 B2
(45) Date of Patent: Aug. 26, 2008

(54) TEMPERATURE SENSITIVE INDICATOR

(76) Inventor: Tatiana Maciulis Dip, Rua Estela 67 Apto. 142, São Paulo-SP, CEP 04011-000 (BR)

( * ) Notice: Subject to any disclaimer, the term of this patent is extended or adjusted under 35 U.S.C. 154(b) by 31 days.

(21) Appl. No.: 10/554,041

(22) PCT Filed: Apr. 24, 2003

(86) PCT No.: PCT/BR03/00061

§ 371 (c)(1),
(2), (4) Date: Oct. 21, 2005

(87) PCT Pub. No.: WO2005/003705

PCT Pub. Date: Jan. 13, 2005

(65) Prior Publication Data

US 2007/0039383 A1    Feb. 22, 2007

(51) Int. Cl.
*G01K 11/06* (2006.01)
(52) U.S. Cl. .................... 116/216; 374/106
(58) Field of Classification Search ........... 116/102, 116/103, 106, 216, 218; 374/106, 160
See application file for complete search history.

(56) References Cited

U.S. PATENT DOCUMENTS

| | | | | |
|---|---|---|---|---|
| 2,788,282 A | * | 4/1957 | Hammond, Jr. | 116/218 |
| 2,915,405 A | * | 12/1959 | Hammond, Jr. et al. | 116/218 |
| 3,233,459 A | * | 2/1966 | Loomis et al. | 374/106 |
| 3,965,848 A | * | 6/1976 | Shotkin | 116/218 |
| 4,114,443 A | * | 9/1978 | Clark | 116/217 |
| 4,132,186 A | * | 1/1979 | Manske et al. | 116/216 |
| 4,145,918 A | * | 3/1979 | Couch et al. | 116/216 |
| 4,280,361 A | * | 7/1981 | Sala | 116/216 |
| 4,457,253 A | * | 7/1984 | Manske | 116/216 |
| 4,509,449 A | * | 4/1985 | Chalmers | 116/218 |
| 4,664,056 A | * | 5/1987 | Jehanno | 116/217 |
| 4,846,095 A | * | 7/1989 | Emslander | 116/206 |
| 5,120,137 A | * | 6/1992 | Ou-Yang | 374/106 |
| 5,144,880 A | * | 9/1992 | Schmit | 99/342 |
| 5,460,117 A | * | 10/1995 | Loustaunau | 116/218 |
| 5,735,607 A | * | 4/1998 | Shahinpoor et al. | 374/187 |
| 6,422,746 B1 | * | 7/2002 | Weiss et al. | 374/156 |
| 6,472,214 B2 | * | 10/2002 | Patel | 436/2 |

FOREIGN PATENT DOCUMENTS

| | | | |
|---|---|---|---|
| DE | 4122361 A1 | * | 1/1993 |
| FR | 2144620 | | 2/1973 |
| FR | 2665957 A1 | * | 2/1992 |
| WO | WO 2007068061 A1 | * | 6/2007 |
| WO | WO 2007128093 A1 | * | 11/2007 |

* cited by examiner

Primary Examiner—R. A. Smith

(57) ABSTRACT

It's a device whose purpose is to monitor the storage and indicate that a frozen product has been subjected to a thermal variation, with temperature rise, causing the fusion and liquefaction of a fluid (H) contained in the indicator. The indicator comprises a hollow, cylindrical tube (2) with an open end (3), featuring a releasable cap (17) and a closed end (4), with a slidable piston (5) inside the tube (2). A compartment (C1), inside the tube (2), placed between the piston (5) and the end (4), is fulfilled with a compressed means like a fluid (O)/spring (M), and a compartment (C2) placed between the piston (5) and the end (3), is fulfilled with the fluid (H), frozen, in the solid state. Upon the thawing of the product, the fluid (H) also thaws, escaping the compartment (C2) and allowing the movement of the piston (5), pushed by the fluid (O). The movement of the piston (5) is irreversible and constitutes the indicator's visual indication revealing that the product has been thaw.

85 Claims, 7 Drawing Sheets

TEMPERATURE SENSITIVE INDICATOR

The temperature sensitive indicator is a device which main purpose is to indicate that a frozen food, either processed or not, has been subjected to a thermal variation which caused the fusion of its water content initially present in the solid form and later liquefied. A food, either processed or not, once thawed, must not be frozen a second time, because such procedure will lower its quality, under any point of view, such as characteristic texture, flavor and nutritional value. The indication by the temperature sensitive indicator of the change of state of the water contained in the food is a valuable information for all those involved in the refrigeration chain of the food, from the manufacturer to the distributor, the retail salesman up to the final consumer, so that a correct evaluation may be conducted establishing whether there was or not a breakdown or problem in the whole commercialization and storage process as far as the refrigeration chain is concerned.

STATE OF THE ART

The creation of devices of several shapes, comprising various substances and based on several material properties, have been proposed to indicate the freezing and thawing of pharmaceutical products, beverages, food products and substances that are sensitive to the changes. The number of existing patents related to the issue testifies the importance of the devices as valuable aids in ensuring the correct maintenance of storage temperature along the various commercialization steps.

Among these patents, we may mention the ones that follow, which disclose devices to indicate whether a given product was submitted to freezing:

U.S. Pat. No. 4,457,253 (Manske—discloses a capillary device containing substances, one of them colorful, of different freezing points inside it separated from each other by immiscible liquids surrounding a porous rubber plug, colorless or white. The contact between the colorful substance and the porous rubber only occurs after the freezing, when the colorful substance pigment dyes the rubber indicating the storage of the monitored product in low temperatures.

U.S. Pat. No. 4,846,095 (Emslander)—discloses a device to detect critical temperature comprising a porous membrane containing two liquids, the membrane only being wetted if the critical temperature is reached.

U.S. Pat. No. 4,132,186 (Manske)—describes a freezing indicator comprising two chambers, one containing an aqueous substance that expands upon freezing; the expansion increases the pressure over the liquid inside the other chamber, which causes its passage through a capillary until it reaches the indicator compartment.

U.S. Pat. No. 5,120,137 (Ou-Yang)—describes a device in which an indicator substance is liquefied whenever a certain temperature is either reached or passed, the substance making contact with an absorbing tape in order to visually register temperature versus time.

Conversely, there are the devices which indicate whether or not a certain frozen product was submitted to thawing, such as the one from U.S. Pat. No. 4,145,918 (Couch et al.), which discloses a thawing indicator in which a water-containing flask is ruptured upon freezing by expansion of the liquid. The flask is placed inside a transparent casing over a paper indicator with ink, and the pigment of the ink is dissolved by the thawed water and reveals the change registered by means of the dying of the paper indicator.

Another device that indicates the thawing of a frozen product is disclosed on patent WO 99/24799 (Massi), which presented a sensor composed of several stacked discs coated with suitable substances that work, for example, as facilitators of water permeation or water soluble dyes recipient, which associated to different permeation paths stamped on another disc allow the conduction of the water until it reaches the visible point of the indicator and detector, thus indicating and signaling the thawing that has occurred.

The thawing indicator devices above feature some inconveniences.

The device of U.S. Pat. No. 4,145,918 requires a glass flask filled with water and a protective capsule that comprises a dye-impregnated filter paper. The constructive disposition does not ensure that the liquid contained in the device overflows the protective casing upon thaw, which may damage the monitored product. Furthermore, the device, being positioned only on the surface of the frozen product, will only indicate the superficial thawing of the product, whereas the interior of the product remains frozen. Another disadvantage of that device is the fact that the construction of the glass flask is made difficult by its particular shape.

Patent WO 99/24799, although bolstering the advantage of the device's low cost, does not specify, either qualitatively or quantitatively, the components of the micro-capsules mentioned in the text, lacking that information; furthermore, it features the disadvantage of monitoring only the superficial thawing of the frozen product. Another disadvantage lies in the fact that an ambient with high concentration of moisture will make the device produce false indications of thawing due to its working principle, which relies on water absorption.

U.S. Pat. No. 5,120,137 features the disadvantage of presenting a band that enables the device's activation, plus the fact that its liquefying substance having a toxic nature, which prevents the device to be placed in intimate contact with food, for example, allowing only a superficial monitoring of temperature and time. The device's cost is also considerably high in view of the constructive material involved.

OBJECTS OF THE INVENTION

In view of the above indicated problems, it is an object of the present invention to provide a device that allows the monitoring of a product's thawing, not only superficially, but in an effective manner, of low cost, and of easy construction and use.

DESCRIPTION OF THE INVENTION

The present invention will be explained based on the figures listed below, in which.

Figure 8:
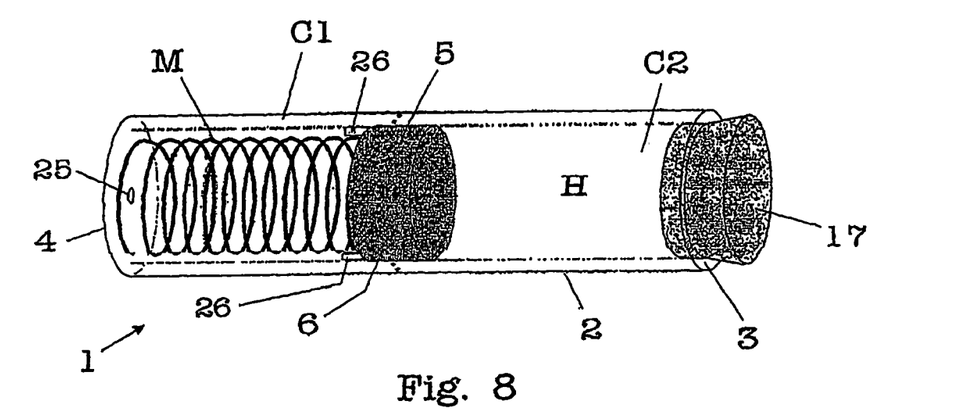
FIG. 8 is a third schematic representation of the indicator of the present invention.

The temperature sensitive indicator of the present invention has applications, mainly in the area of frozen food. As seen on FIG. 1A, indicator 1 comprises, basically, one hollow, cylindrical tube 2, preferably made of a rigid, transparent, opaque or translucent material, with a first end 3 open and a second end 4 closed, with a sliding piston 5 inside the tube 2. A compartment C1, inside the tube 2, comprised between the piston 5 and the end 4, is filled with a compressed fluid O, preferably gaseous, such as air or nitrogen, for example; instead of the fluid O, the compartment C1 may contain a spring M, compressed, with an end of the spring leaning on the end 4 and the other end of the spring touching the sliding piston 5 as illustrated on FIG. 8. Optionally, the end 4 features a passing hole 25 to allow the admittance of air into the compartment C1 upon the movement of sliding piston 5.

Figure 1A:
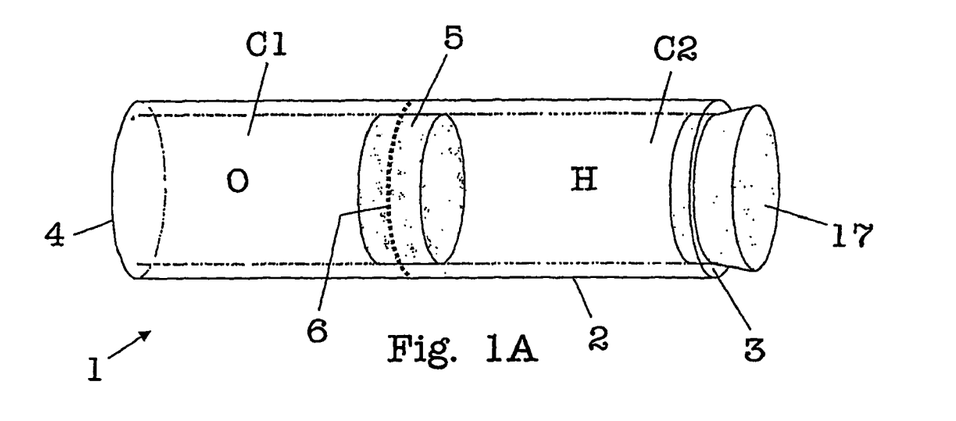
FIGS. 1A and 1B are schematic representations of two situations of the temperature sensitive indicator, in its simplest configuration.

Whereas a compartment C2 comprised between the piston 5 and the end 3 is filled with a fluid H, frozen to the solid state, preferably having, however, a liquid constitution at a certain temperature above the monitoring point; the same fluid H must preferably be non-toxic, being possibly of a similar nature to that of the food in which the indicator of the present invention will be used. The end 3 features a releasable cap 17, and there is optionally an engraving 6 made on tube 2, and this engraving coincides with the position where the piston 5 is, with the fluid H perfectly frozen.

Figure 1B:
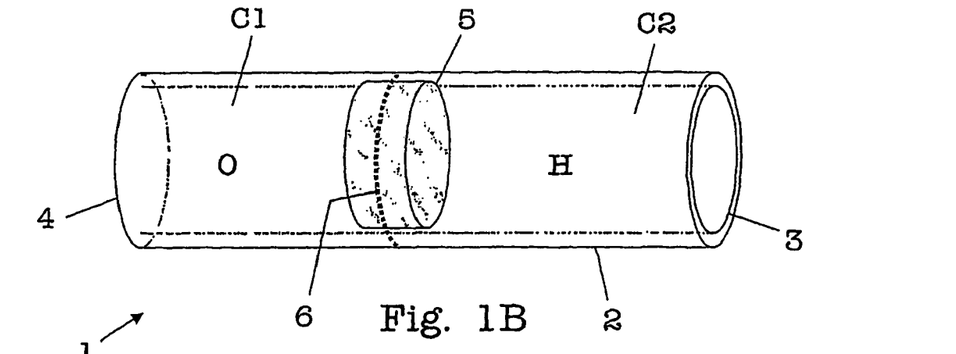
Figure 2:
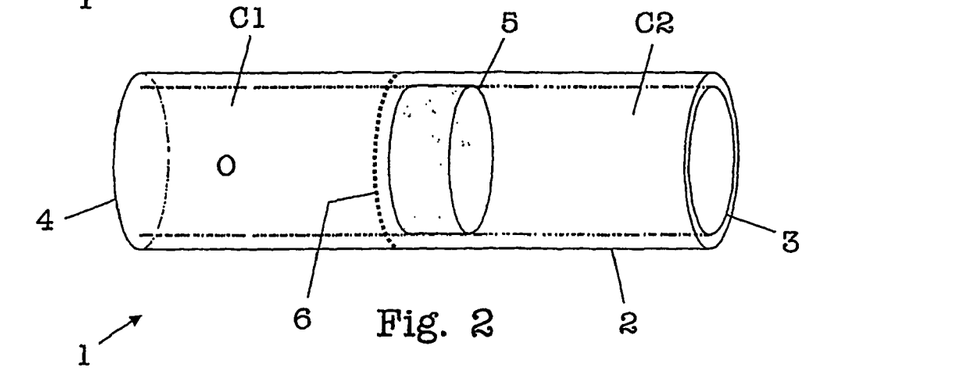
FIG. 2 is a second schematic representation of the present indicator, illustrating its operation.

The temperature sensitive indicator features a very low probability of failure, upon monitoring frozen food, once the device's operation is based on principles already very well proven of Physics and Chemistry. One of these principles is the expansion of the liquid fluids during freezing, reflecting, for example, in the case of pure water, an increase of about 10% of its initial volume. The water expansion force is so great, that in the Ancient Age, the freezing force was used to displace boulders in the civil engineering works of the era. Thus, the acting of the indicator at hand occurs in the following manner: before indicator 1 is submitted to a temperature that allows the freezing of fluid H, this is in a liquid state, and the end 3 has its cap 17 placed on, as seen on FIG. 1A; when the indicator 1 is immersed in an ambient which fosters the freezing of fluid H, the later becomes solid, frozen, and has its volume expanded, causing the expulsion of cap 17, which thus leaves the end 3 open, free; as the fluid O, gaseous, or alternatively the spring M, are compressed inside compartment C1, it is under pressure and exerts a spring effect, trying to push the piston 5 towards the end 3. However, the fluid H, frozen, contained inside compartment C2, being in its solid state does not allow the piston 5 to move from its place, regardless of the pressure exerted by compressive means like a fluid O/spring M. This situation remains unaltered for as long as the fluid H remains frozen, that is, as long as the indicator 1 is immersed in an ambient, which temperature is either equal or lower than the freezing point of fluid H, as shown on FIG. 1B; but if at any moment the temperature increases to a value above the freezing point of fluid H, thus causing a thaw, the fluid H will revert totally or partially to the liquid state and will spill out of tube 2, through the open end 3. That will allow the piston 5 to move inside tube 2, pushed by fluid O/spring M; the movement may be viewed, because piston 5 has left the position corresponding to the engraving 6 as shown on FIG. 2, indicating the occurrence of a temperature rise in the ambient in which indicator 1 was immersed, with the consequent thaw.

Even if the thaw occurs only for a brief moment and is followed by a new lowering of the temperature up to a point of re-freezing, as the fluid H has escaped to the outside of tube 2, compartment C2 became empty, and thus there is no element left to prevent the movement of piston 5 or make it go back to its previous position on the engraving 6. As the indicator of the present invention must be in physical contact with the frozen food to be monitored, there is an inerasable register of whether there has or has not been thawing of the food.

Figures 3A, 3B, 3C, 3D:
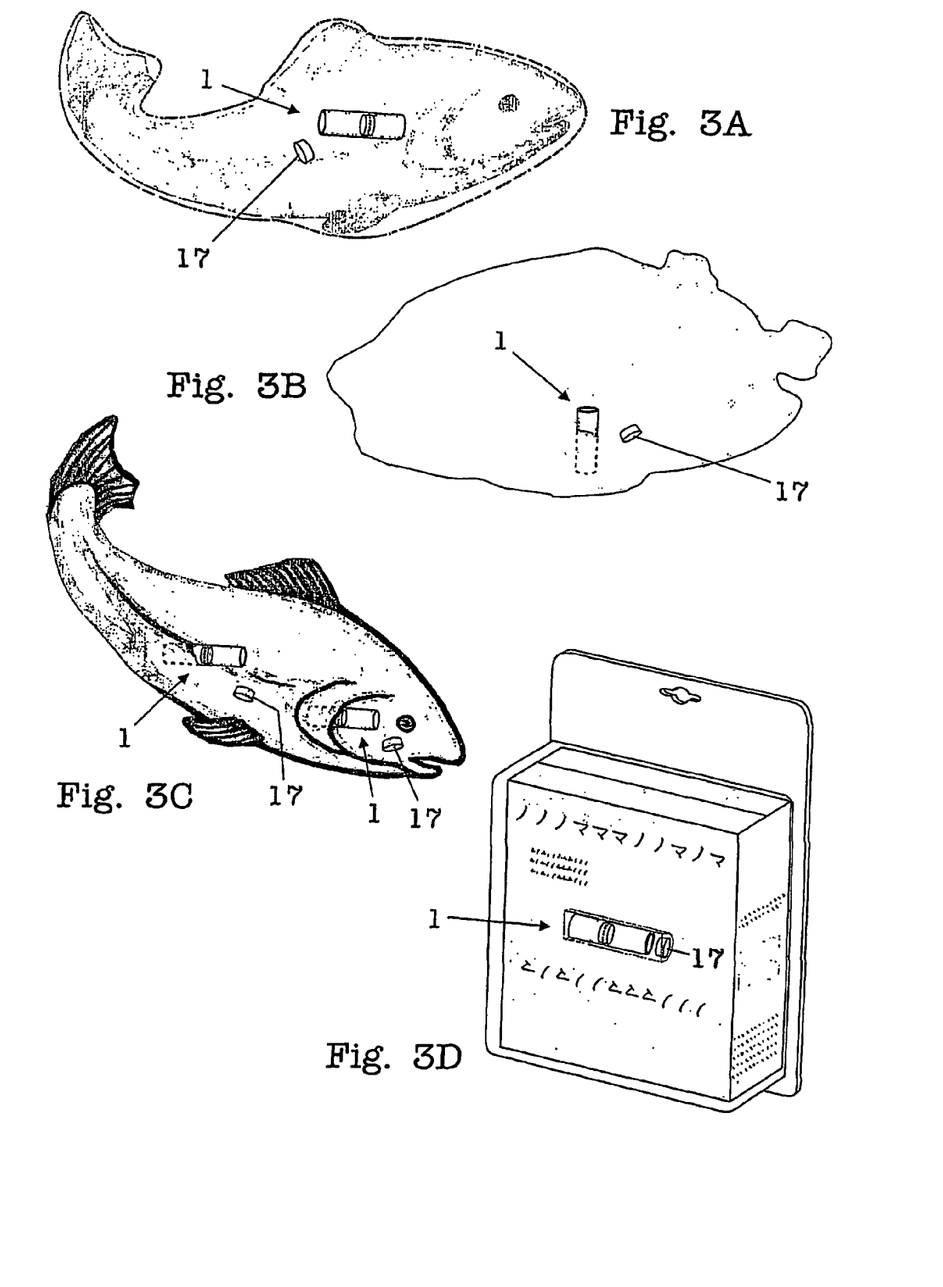
FIGS. 3A to 3D exhibit some forms of use of the indicator of the present invention in contact with food.

On FIGS. 3A to 3D are shown some forms of use of the indicator in contact with the frozen food, observing that the cap 17 has already been expelled from the indicators, leaving its ends 3 free; the packing of indicator 1 can be, for example, in the outer package, outside of the food, as illustrated on 3A; inserted vertically in the food, as shown in 3B; at least two different indicators 1, placed on a single food, inserted horizontally, as shown in 3C, so that it is possible to monitor different areas of the same food, independently; the indicator 1 is directly integrated to a packaging of the "blister" kind wrapped around the food, as shown on FIG. 3D so that tube 2 configures an integrated part of the packaging, from which it cannot be dissociated.

In case of thawing, or even extreme mechanical shock, with breakage or destruction of the indicator, there will be a spill and probably spread of the fluid H over the food; as such, fluid H must be preferably non-toxic, and its nature may, as already mentioned, be similar to that of the food, meaning that there will be no damage or contamination of the food.

Figure 4A:
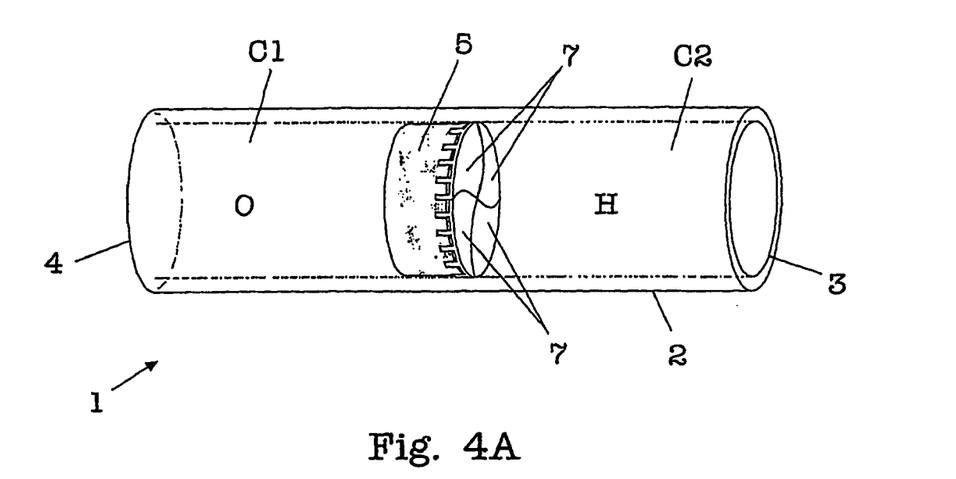
FIGS. 4A and 4B show in detail the operation of a constructive variant allowing a better view of the indication of the present invention's indicator.

It is important to allow the consumer to easily see the current state of piston 5, whether it is at the position indicated by engraving 6 or not. When the indicator 1 is positioned as shown on FIGS. 3A, 3C and 3D, it is quite easy, however, the disposition illustrated on FIG. 3B does not afford a view of the side part of tube 2 of indicator 1, being visible only at its end 3. Therefore, to acquire a view of whether the piston 5 has moved or not exclusively through the end 3, there is a constructive variant applied to the indicator 1 comprising the addition of laminar, movable petals 7 on the inside of tube 2, close to the face of piston 5 that faces the end 3, as illustrated on FIG. 4A where the petals are seen in their closed position, equivalent to the situation shown on FIG. 1B when the indicator 1 has its fluid H perfectly frozen and the cap 17 has already been expelled, meaning also that the food is also frozen.

Figure 4B:
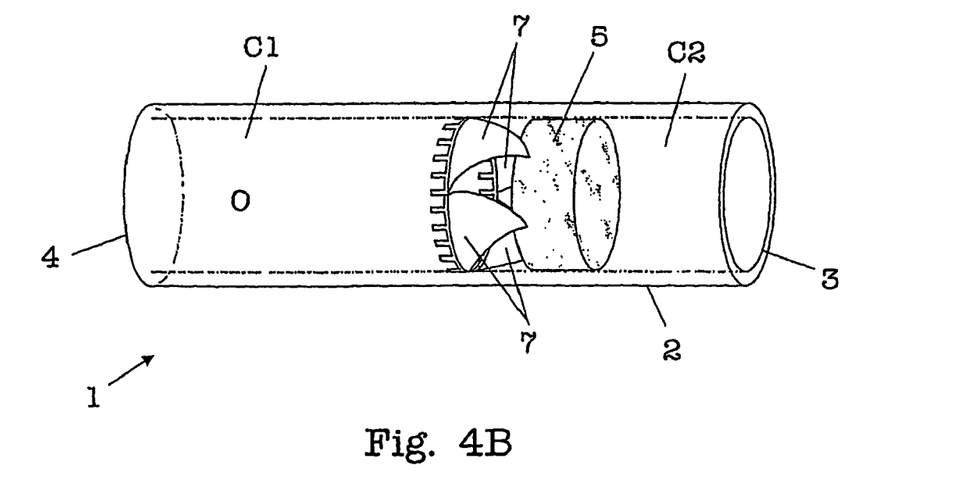
Figure 5A:
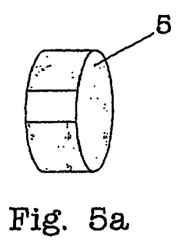
FIGS. 5A to 5K show some variants of the possible formats and finishing that may be used in the present invention.
Figure 5B:
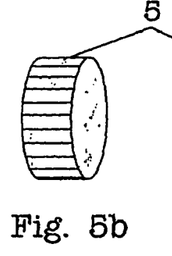
Figure 5C:
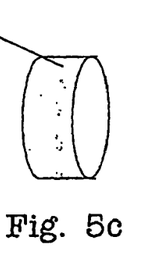
Figure 5D:
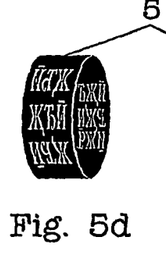
Figure 5E:
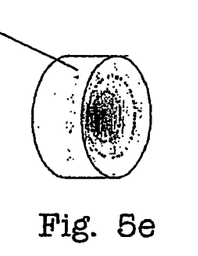
Figure 5F:
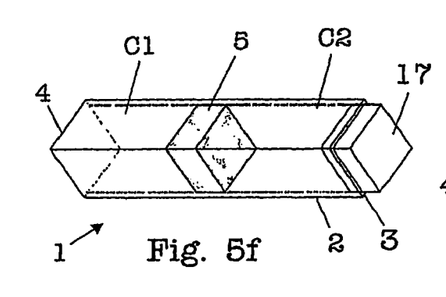
Figure 5G:
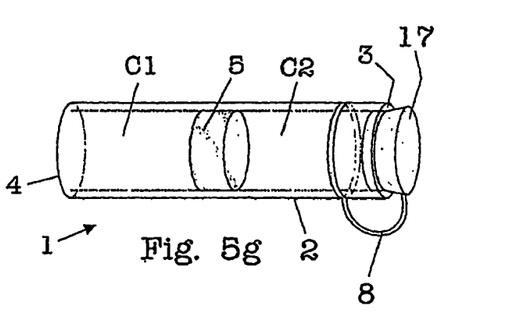
Figure 5H:
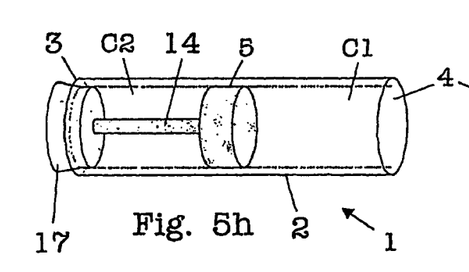
Figure 5I:
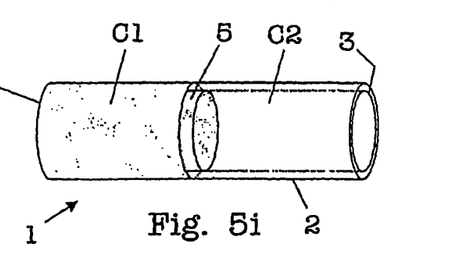
Figure 5J:
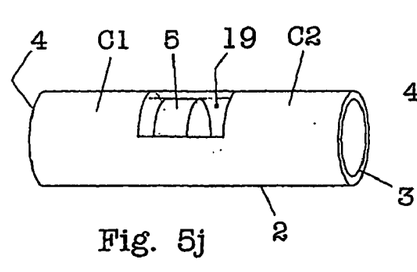
Figure 5K:
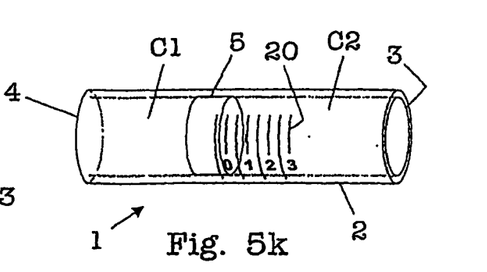
Figure 6L:
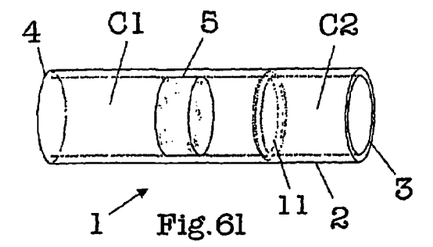
FIGS. 6L to 6S and 7T to 7W show yet further variants of the possible constructive forms of use of the present invention.
Figure 6M:
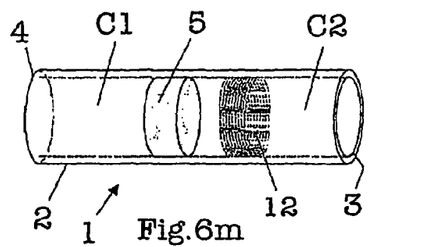
Figure 6N:
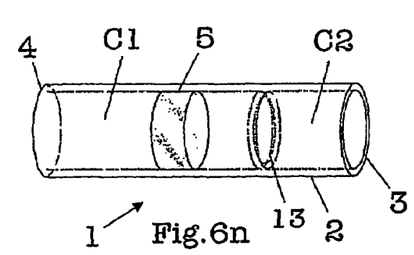
Figure 6O:
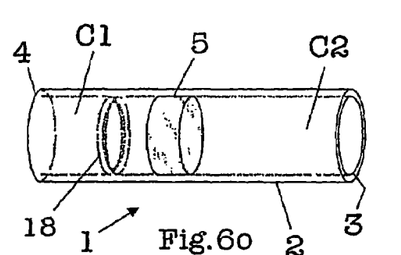
Figure 6P:
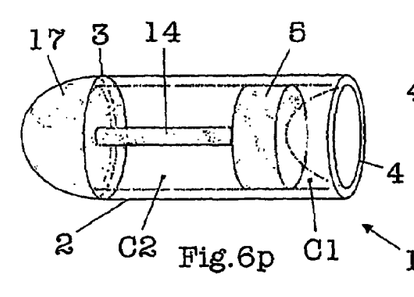
Figure 6Q:
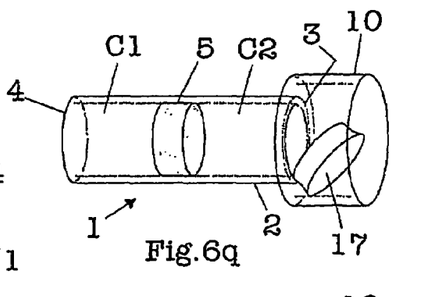
Figure 6R:
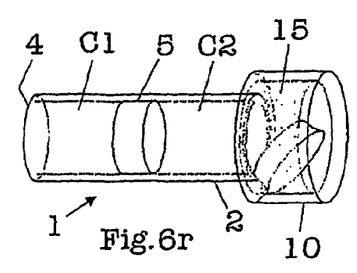
Figure 6S:
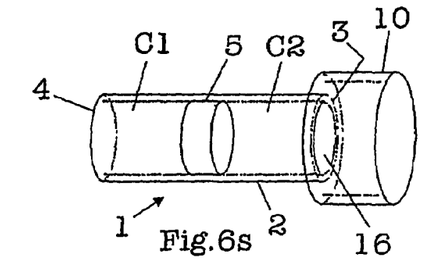
Figure 7T:
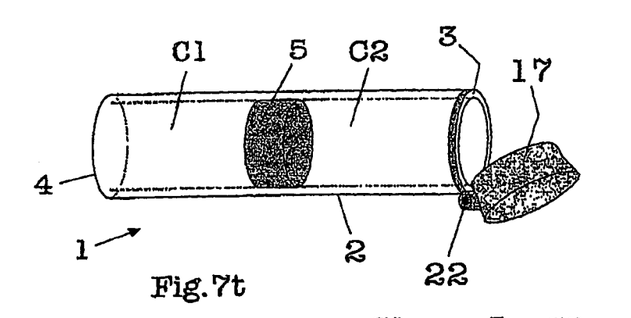
Figure 7U:
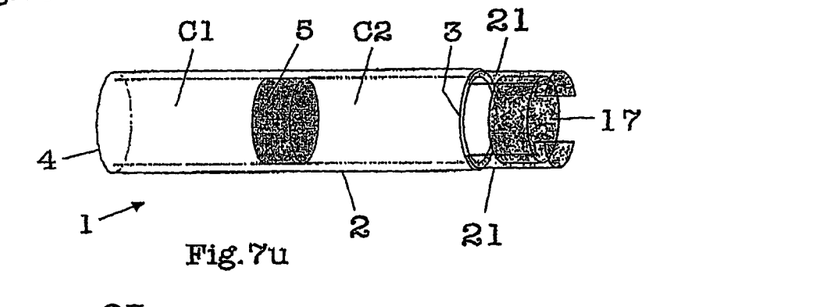
Figure 7V:
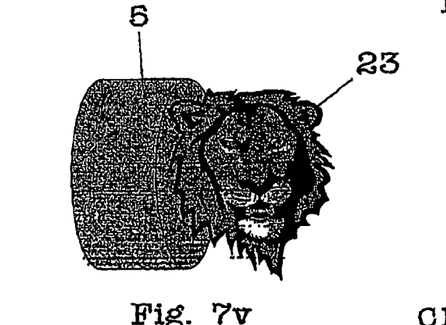
Figure 7W:
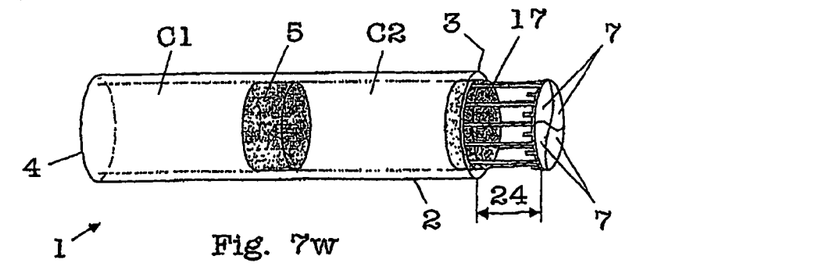

Once again, as already exposed on the lines above, if at any moment the temperature reaches a value above the freezing point of fluid H, causing thawing, the fluid H will return totally or partially to the liquid state and will leak through the end 3 to the outside of tube 2, allowing the movement of piston 5, pushed by fluid O/spring M; the movement may be seen through the aperture of the petals 7 because the piston 5 has pushed them, as shown on FIG. 4B, indicating the temperature rise, with the consequent thawing of the food. It is interesting that the petals 7 and the piston 5 are presented in contrasting colors in order to make the viewing easy. Thus, in the situation where the food is perfectly frozen, what is seen through the end 3 are the petals 7 closed, with their characteristic color. When the food has thawed, what is seen through the end 3 is the face of piston 5, with its characteristic color, contrasting to the color of the petals 7, which are at this particular moment opened and hard to see.

Given its simple constitution, the cost of the temperature sensitive indicator for stock control is very low, if compared to the price of the monitored product. The monitored product presents a qualitative advantage upon competing with an equivalent product without such monitoring, because it incorporates the confidence that the product was correctly stored since its manufacture up to the moment it reaches the hands of the final consumer. The temperature sensitive indicator, being inside the package, has the advantage of hindering adulterations or frauds. Furthermore, being completely non-toxic, it is in intimate contact with the food, featuring a much more faithful monitoring, a much more real representation of the critical history of time/temperature of the internal parts of the food product, bringing about advantages compared to the state of the art indicators.

The indicator of the present invention features alternative options for the nature of the fluid H, in order to provide other temperatures for its freezing/thawing point. If only pure water is used for the fluid H, the thawing point will be 0° C., which is the temperature of ice fusion under the atmospheric pressure deemed normal. This way, if the temperature sensitive indicator is submitted to any temperature above 0° C., it will register that happening in the manner already explained. Adding to the fluid H jelly, salts and other compatible substances, the temperature of the thawing point of fluid H changes to values above or below 0° C. As an example, in the case of addition of jelly in any proportion to pure water to form the fluid H, the fluidification point will be in a given temperature T above 0° C., and the present indicator will, therefore, register the occurrence of temperatures above the value T; if alcohol is added, in any proportion, the fluidification point will be in a temperature T' below 0° C., and the sensor will consequently register the occurrence of temperatures above the value T'.

Other kinds of materials may also be added to the fluid H, such as, for example, a dye or pigment, to aid the viewing of the fluid; solid granulate material may also be added, composed by tips/threads, to aid the beginning of the fluid H nucleation, facilitating also the viewing of the indicator's indication; a surfactant material, to facilitate the movement of the ice crystal of the indicator after the occurrence of a partial thawing, also ensuring that there will be a good flowing of the fluid H already liquefied, totally defrosted, and to facilitate the solubilization of dyes/pigments along the fluid H.

Alternatively, a thermal insulation may also be provided between the sensor of the present invention and the monitored product. Once there is a certain heat flow rate to cause the thawing of fluid H, the thermal insulation is set in the form of a vacuum layer, an air layer, a water layer, some other liquid layer, or a layer of other insulating materials placed between indicator tube 2 and the food product to be monitored. A manner to make it is to place the indicator 1 inside a plastic bubble hermetically closed that contains air or vacuum; this set formed by the plastic bubble with the indicator 1 inside is then placed along the product for monitoring.

Tube 2 and piston 5 may receive diverse finishing according to the ornamental aspect desired for the indicator 1, including total or partial painting, and feature engraved details. FIG. 5 exhibits some variants of possible formats and finishing that may be used in the indicator of the present invention. In (a) is seen the piston 5 with its lateral presenting a horizontal stripe either painted or mounted; in (b), the piston 5 with its several horizontal stripes painted or mounted; in (c) at least one of the faces of piston 5 presenting a color different from that of the lateral of the same piston; in (d) the piston 5 presents characters or signals written on the lateral and on at least one face of the same piston; the piston 5 presents one of its faces with a convex shape, or alternatively, as illustrated on (e), concave shape; in (f) both the piston 5 and the tube 2 and the cap 17 feature a polygonal cross section, square in the case illustrated; in (g) the cap 17 features a flexible wire or stem 8 connecting cap 17 to the body 2, so that when the indicator 1 is placed in an ambient that favors the freezing of fluid H and this, frozen, expels the cap 17 to liberate the end 3, the cap 17 will not be free, lost in the middle of the food product that is being monitored. On the contrary, the flexible stem 8 keeps the cap 17 close and connected to the body 2, with the open end 3 free for the flow of fluid H when this thaws. In (h) is seen a stem 14 connected to the face of piston 5 that sits facing the end 3, with the purpose of causing yet more compression of the fluid O upon the assembly of the indicator 1, with the fluid H in the liquid state, because upon placing the cap 17 at the end 3, the cap pushes the stem 14 as well as the piston 5 towards the end 4. In (i) the body 2 has its portion corresponding to compartment C2 transparent, while the portion corresponding to the compartment C1 is not transparent. In (j) a great part of the body 2 is not transparent, however a region 19 of the same body 2 is transparent, with region 19 constituting a viewing window that allows the viewing of piston 5 when the fluid H is defrosted. In (k) the body 2 features equally spaced markings, constituting a scale 20, in the region close to the position of piston 5; scale 20 has the purpose of allowing an estimate of the thawing time for the product monitored by the indicator 1, for as thawing occurs, as already explained, the piston 5 moves inside the tube 2, along scale 20.

FIG. 6 illustrates some other variants of constructive forms used on the temperature sensitive indicator at hand. In (l) is illustrated the existence of a ring-shaped concavity 11 inside the tube 2, in lower relief, on the region of compartment C2, the concavity serving as an anchor for the fluid H, preventing the movement or sliding of fluid H, while frozen, inside compartment C2. The anchoring ensured that the indicator will not present a mistaken indication due to the complete sliding of the solid bloc of fluid H when frozen, allowing the piston 5 to leave its place. Anchoring can also be effected, as shown in (m), by means of a rib 12 in higher relief in the internal wall of compartment C2. The rib 12 may be constituted by narrow bars, triangular teeth or other polygonal shapes; and the rib must be located in an area relatively far from the area where the piston 5 is placed, so as not to interfere on its movement. In (n) is seen a course limiter 13 inside the tube 2, in higher relief, in the region of compartment C2, behaving in a similar manner to that of concavity 11 with the same effect of anchoring, but now also being able to act as a course limiter for the piston 5, when this moves due to the thawing of fluid H. In (o) is seen a course limiter 18 inside the tube 2, in higher relief, in the region of compartment C1, acting as a course limiter for the piston 5 when this moves towards the end 4 to compress the fluid O. In (p) is seen a preferential constructive farm for the indicator 1, in which the end 4 features a concave shape, the releasable cap 17 convex shaped, with the presence of the stem 14.

Continuing with FIG. 6, in (q) is observed that the open end 3 of tube 2 was integrated to a collecting receptor 10, closed, which purpose is to receive the fluid H when this thaws. This prevents the fluid from leaking to the food product that is being monitored, avoiding contact between the two; and the cap 17, upon being expelled from the end 3 upon the freezing of fluid H, will also remain inside the collecting receptor 10. Alternatively, receptor 10 may feature an open end whenever the mixing between the food product and the fluid causes no harm. In (r) is shown the collecting receptor 10 with its internal wall covered with an absorbent material 15, which function is to absorb the fluid H when this is liquefied. The material 15 can be constituted by a chemical powder or by a paper or absorbent foam sheet; material 15 may react chemically with the liquefied fluid H, upon absorbing it, so that it presents a contrasting color to aid the viewing of the indication of the sensor of the present invention when thawing occurs. In this scope, it is possible, alternatively, that the collecting receptor 10 has a characteristic physical disposition, in the shape of drawings or symbols, in such a way that the presence there of the fluid H, defrosts, brings up a contrasting color of this same drawings or symbols. In (s) is seen a membrane 16 closing the end 3 exactly at the integration point between the end and the collecting receptor 10; this membrane 16 is thin, and can be made of plastic, paper or equivalent material of a delicate constitution, replacing the cap 17, in such a way that when the temperature sensitive indicator suffers the freezing process, deriving from the first and only time in which the indicator will be used, the frozen fluid H expands and part of, or all of the membrane 16 is ruptured. When the fluid H is liquefied, on the thawing of the monitored product, it flows to the collector 10 passing by the end 3 and the ruptured membrane 16. Alternatively, closing the end 3, the membrane 16 may exist even if there is no collecting receptor 10 integrated to the end 3.

FIG. 7 shows more variants of constructive forms used on the indicator for storage control of the present invention. In (t) the cap 17 has a hinge 22 connecting cap 17 to the body 2, acting in the same way that the flexible stem 8, already explained: when the fluid H of the indicator 1 freezes, there is the expulsion of the cap 17 but this does not come free, because the hinge 22 keeps the cap 17 close and connected to the body 2, with the open end 3 free for the flow of fluid H when this thaws. In (u) the end 3 of body 2 features fasteners 21 that keep the cap 17 close to the body 2, when the fluid H freezes and the cap 17 is expelled; however, the fasteners 21 have a shape and physical dimensions such that they allow that the end 3 remains free and open to the flow of fluid H, when this thaws, regardless of the proximity of cap 17 previously dropped. In (v), in an enlarged view, the piston 5 presents a three dimensional object or physical shape 23 applied to at least one face of the same piston. In (w) the laminar petals 7 are located near the end 3, inside the collecting receptor 10, or even the petals coincide with the very end 3, with a spacing 24 between petals 7 and the cap 17.

Figure 9:
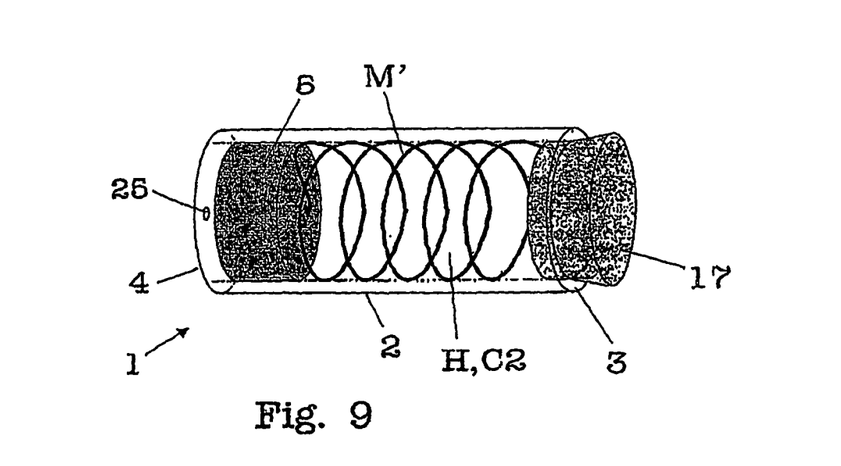
FIG. 9 is a fourth schematic representation of the indicator of the present invention.

FIG. 9 illustrates yet another variant of the temperature sensitive indicator for storage control, in which there simply is no compartment C1, featuring only compartment C2. The sliding piston 5 is positioned close to the end 4, and there is also optionally the passing hole 25 which allows the entrance of air in the tube 2 upon the movement of the sliding piston 5. A spring M', relaxed, is placed in the compartment C2, with one of its ends attached to the sliding piston 5 and its other end attached to cap 17; the compartment C2 is, as already described, filled with the frozen fluid H. The operation of this variant of the indicator for storage control is also identical to the one already explained, with the fluid H freezing and ejecting cap 17 from the end 3; when fluid H thaws, the spring M', which is the sliding piston 5 towards the end 3 of tube 2, aiding in the ejection of fluid H from compartment C2.

The stock control indicator, before being subject to its first and only freezing, may be placed along a heated product or an already hot product. When the product, along with the indicator, is placed in an ambient that favors freezing, the fluid (H) also freezes, with the beginning of the storage monitoring of the product.

The present indicator for storage control is not limited to use on food, and can be used along with any product that one wishes to monitor for freezing, for example, blood bags, medicine, resins used in manufacturing processes, etc.

With a description of a preferential incorporation example, it must be understood that the scope of the present invention covers other possible variants, being limited only by the contents of the appended claims, there including the possible equivalents.

What is claimed is:

1. Temperature sensitive indicator comprising:
   a tube that comprises a first open end and a second closed end;
   an axially movable slidable piston to be assembled inside the tube forming a first compartment comprised between the piston and the closed end and a second compartment comprised between the piston and the open end;
   compressible means to be located inside the first compartment inside the tube;
   a freezable fluid to be located in a the second compartment inside the tube;
   a releasable cap to cover the first open end of the tube and to be responsible to hold the freezable fluid;
   wherein the temperature sensitive indicator is activated when the releasable cap released by the frost action of the freezable fluid inside the second compartment and the temperature sensitive indicator reveals the occurrence of the temperature increase in the environment in which the indicator is immersed, by the irreversible motion of the piston in a single direction inside the tube when the freezable fluid inside the second compartment thaws and flows out of the tube.

2. The indicator of claim 1, wherein the cap is partially released by the frost action of the freezable fluid inside the second compartment, the freezable fluid in a frozen condition being anchored by at least one internal rib located inside the second compartment.

3. The indicator of claim 1, wherein the releasable cap maintains the freezable fluid inside the second compartment prior to the frost action.

4. The indicator of claim 1, wherein the compressible means comprises a gaseous fluid.

5. The indicator of claim 1, wherein the compressible means comprises a spring.

6. The indicator of claim 1, wherein the compressible means comprises a spring and a gaseous fluid.

7. The indicator of claim 1, wherein the freezable fluid prevents movement of the piston when the freezable fluid is frozen.

8. The indicator of claim 1, wherein the cap is total released by the frost action of the freezable fluid inside the second compartment, the freezable fluid in a frozen condition being anchored by at least one internal rib located inside the second compartment.

9. The indicator of claim 1, wherein the media associated with the tube to provide at least one indication of the occurrence of a temperature rise in an ambient in which the indicator is immersed comprises an engraving on the tube coinciding with the position of the piston inside the tube when the freezable fluid is frozen.

10. The indicator of claim 1, further comprising movable laminar petals positioned inside the tube between the first compartment and the second compartment.

11. The indicator of claim 10, wherein the movable laminar petals exhibit a closed position when the freezable fluid is in the frozen state inside the first compartment.

12. The indicator of claim 10, wherein the movable laminar petals exhibit a open position when the freezable fluid is in a non-frozen or partially thawed state inside the first compartment.

13. The indicator of claim 10, wherein the color of the movable laminar petals and the color of the piston are contrasting.

14. The indicator of claim 1, further comprising at least one thermal insulator surrounding at least a portion of the indicator.

15. The indicator of claim 1, wherein the releasable cap and the tube are connected by a securement means keeping the releasable cap connected to the tube when the releasable cap is detached from the open end of the tube.

16. The indicator of claim 1, further comprising a collecting receptor for collecting any freezable fluid that flows out the second compartment of the tube.

17. The indicator of claim 16, wherein the collecting receptor comprising an absorbent material for absorbing any freezable fluid in liquid state that flows out the tube.

18. The indicator of claim 16, wherein the collecting receptor comprises an absorbent material capable of reacting with the freezable fluid in liquid state to promote a color alteration of the absorbent material.

19. The indicator of claim 1, further comprising a course limiter inside the tube to limit the movement of the piston inside the tube.

20. The indicator of claim 19, wherein the course limiter is located inside the first compartment.

21. The indicator of claim 19, wherein the course limiter is located inside the second compartment.

22. The indicator of claim 1, further comprising a hole in the closed end of the tube, the hole allowing air to flow into the tube as the moveable piston moves axially inside the tube.

23. The indicator of claim 1, further comprising at least one additive mixed with the freezable fluid, wherein the said additive comprising a gel, salts, fluid freezing modifiers and fluid thawing modifiers.

24. The indicator of claim 1, further comprising a granulated solid material mixed with the freezable fluid, wherein the granulated solid material promotes nucleation of the freezable fluid.

25. The indicator of claim 1, further comprising an additive mixed with the freezable fluid, wherein the said additive comprising dye, pigment and coloring material.

26. The indicator of claim 1, further comprising spaced marks on the tube.

27. An indicator for stock control, comprising:
a hollow tube having an open end and a closed end;
a piston positioned inside the hollow tube, wherein the piston creates a first space between a first side of the piston and the open end and a second space between a second side of the piston and the closed end, the piston having a circumference in contact with the hollow tube;
a first fluid in the first space;
a force generating object in the second space; and
media associated with the hollow tube to provide at least one indication of the occurrence of a temperature rise in an ambient in which the indicator is immersed
wherein the force generating object comprises a gaseous fluid.

28. An indicator for stock control comprising:
a hollow tube having an open end and a closed end;
a piston positioned inside the hollow tube wherein the piston creates a first space between a first side of the piston and the open end and a second space between a second side of the piston and the closed end, the piston having a circumference in contact with the hollow tube;
a first fluid in the first space
a force generating object in the second space; and
media associated with the hollow tube to provide at least one indication of the occurrence of a temperature rise in an ambient in which the indicator is immersed;
further comprising movable laminar petals positioned within the hollow tube between the first space and the second space, said movable laminar petals exhibiting a closed position when the first fluid is in a frozen state within the first space.

29. The indicator of claim 28, wherein the movable laminar petals exhibit an open position when the first fluid is in a non-frozen or partially thawed state.

30. The indicator of claim 28, wherein the movable laminar petals and the piston feature colors that are in contrast with each other.

31. An indicator for stock control, comprising:
a hollow tube having an open end and a closed end;
a piston positioned inside the hollow tube, wherein the piston creates a first space between a first side of the piston and the open end and a second space between a second side of the piston and the closed end the piston having a circumference in contact with the hollow tube;
a first fluid in the first space;
a force generating object in the second space; and
media associated with the hollow tube to provide at least one indication of the occurrence of a temperature rise in an ambient in which the indicator is immersed further comprising a feature for preventing movement of the first fluid in a frozen state within the first space, the feature selected from the group consisting of a ring-shaped concavity and a rib.

32. An indicator comprising:
a hollow elongated housing having an open end and a closed end;
a moveable piston positioned in the closed end of the hollow elongated housing;
a cap positioned in the open end of the hollow elongated housing,
a spring attached to the moveable piston and the cap; and
a fluid in the hollow elongated housing between the moveable piston and the cap, the fluid capable of being frozen;
said indicator further comprising a hole in the closed end of the hollow elongated housing, the hole allowing air to flow into the hollow elongated housing as the moveable piston moves within the hollow elongated housing.

33. A temperature sensitive indicator comprising:
a tube that comprises a first open end and a second closed end,
an axially movable slidable piston to be assembled inside the tube forming a first compartment comprised between the piston and the closed end and a second compartment comprised between the piston and the open end;
compressible means to be located inside the first compartment inside the tube;
a freezable fluid to be located in the second compartment inside the tube;
a releasable cap to cover the first open end of the tube and to be responsible to hold the freezable fluid;
wherein the temperature sensitive indicator is activated when the releasable cap is partially released by the frost action of the freezable fluid inside the second compartment, and wherein the cap and the freezable fluid prevent the movement of the piston.

34. The indicator of claim 33, wherein the releasable cap maintains the freezable fluid inside the second compartment prior to the frost action.

35. The indicator of claim 33, wherein the compressible means comprises a gaseous fluid.

36. The indicator of claim 33, wherein the compressible means comprises a spring.

37. The indicator of claim 33, wherein the compressible means comprises a spring and a gaseous fluid.

38. The indicator of claim 33, wherein the freezable fluid prevents movement of the piston when the freezable fluid is frozen.

39. The indicator of claim 33, wherein the cap is partially released by the frost action of the freezable fluid inside the second compartment, the frozen fluid being anchored by at least one internal rib.

40. The indicator of claim 39, wherein the rib is located inside the second compartment.

41. The indicator of claim 33, wherein the media associated with the tube to provide at least one indication of the occurrence of a temperature rise in an ambient in which the indicator is immersed comprises au engraving on the tube coinciding with the position of the piston inside the tube when the freezable fluid is frozen.

42. The indicator of claim 33, further comprising movable laminar petals positioned inside the tube between the first compartment and the second compartment.

43. The indicator of claim 42, wherein the movable laminar petals exhibit a closed position when the freezable fluid is in the frozen state inside the first compartment.

44. The indicator of claim 42, wherein the movable laminar petals exhibit an open position when the freezable fluid is in a non-frozen or partially thawed state inside the first compartment.

45. The indicator of claim 42, wherein the color of the movable laminar petals and the color of the piston are contrasting.

46. The indicator of claim 33, further comprising at least one thermal insulator surrounding at least a portion of the indicator.

47. The indicator of claim 33, wherein the releasable cap and the tube are connected by a securement means keeping the releasable cap connected to the tube when the releasable cap is detached from the open end of the tube.

48. The indicator of claim 33, further comprising a collecting receptor for collecting any freezable fluid that flows out of the second compartment of the tube.

49. The indicator of claim 48, wherein the collecting receptor comprising an absorbent material for absorbing any freezable fluid in liquid state that flows out the tube.

50. The indicator of claim 48, wherein the collecting receptor comprises an absorbent material capable of reacting with the freezable fluid in liquid state to promote a color alteration of the absorbent material.

51. The indicator of claim 33, further comprising at least one internal rib to be located inside the second compartment inside the tube and to be responsible to anchor the freezable fluid inside the second compartment.

52. The indicator of claim 33, further comprising a course limiter inside the tube to limit the movement of the piston inside the tube.

53. The indicator of claim 52, wherein the course limiter is located inside the first compartment.

54. The indicator of claim 52, wherein the course limiter is located inside the second compartment.

55. The indicator of claim 33, further comprising a hole in the closed end of the tube, the bole allowing air to flow into the tube as the moveable piston moves axially inside the tube.

56. The indicator of claim 33, further comprising at least one additive mixed with the freezable fluid, wherein the said additive comprising a gel, salts, fluid freezing modifiers and fluid thawing modifiers.

57. The indicator of claim 33, further comprising a granulated solid material mixed with the freezable fluid, wherein the granulated solid material promotes nucleation of the freezable fluid.

58. The indicator of claim 33, further comprising an additive mixed with the freezable fluid, wherein the said additive comprising dye, pigment and coloring material.

59. The indicator of claim 33, further comprising spaced marks on the tube.

60. Temperature sensitive indicator comprising
a tube that comprises a first open end and a second closed end,
an axially movable piston to be assembled inside the tube forming a first compartment comprised between the piston and the closed end and a second compartment comprised between the piston and the open end;
compressible means to be located inside the first compartment inside the tube;
a freezable fluid to be located in the second compartment inside the tube;
wherein the temperature sensitive indicator is activated by the frost action of the freezable fluid inside the second compartment and the temperature sensitive indicator reveals the occurrence of the temperature increase in the environment in which the indicator is immersed by the irreversible motion of the piston in a single direction inside the tube when the freezable fluid inside the second compartment thaws and flows out the tube.

61. The indicator of claim 60, wherein the compressible means comprises a gaseous fluid.

62. The indicator of claim 60, wherein the compressible means comprises a spring.

63. The indicator of claim 60, wherein the compressible means comprises a spring and a gaseous fluid.

64. The indicator of claim 60, wherein the freezable fluid prevents movement of the piston when the freezable fluid is frozen.

65. The indicator of claim 60, wherein the media associated with the tube to provide at least one indication of the occurrence of a temperature rise in an ambient in which the indicator is immersed comprises an engraving on the tube coinciding with the position of the piston inside the tube when the freezable fluid is frozen.

66. The indicator of claim 60, further comprising movable laminar petals positioned inside the tube between the first compartment and the second compartment.

67. The indicator of claim 66, wherein the movable laminar petals exhibit a closed position when the freezable fluid is in the frozen state inside the first compartment.

68. The indicator of claim 66, wherein the movable laminar petals exhibit an open position when the freezable fluid is in a non-frozen or partially thawed state inside the first compartment.

69. The indicator of claim 66, wherein the color of the movable laminar petals and the color of the piston are contrasting.

70. The indicator of claim 60, further comprising at least one thermal insulator surrounding at least a portion of the indicator.

71. The indicator of claim 60, further comprising a collecting receptor for collecting any freezable fluid that flows out the second compartment of the tube.

72. The indicator of claim 71, wherein the collecting receptor comprising an absorbent material for absorbing any freezable fluid in liquid state that flows out the tube.

73. The indicator of claim 72, wherein the absorbent material is capable of reacting with the freezable fluid in liquid state to promote a color alteration of the absorbent material.

74. The indicator of claim 60, further comprising at least one internal rib to be located inside the second compartment inside the tube and to be responsible to increase the friction between the freezable fluid inside the second compartment and the said tube while the fluid is frozen.

75. The indicator of claim 60, further comprising a breakable thin membrane attached to the open end of the tube, wherein the thin membrane maintains the freezable fluid inside the second compartment of the tube.

76. The indicator of claim 60, further comprising a course limiter inside the tube to limit the movement of the piston inside the tube.

77. The indicator of claim 76, wherein the course limiter is located inside the first compartment.

78. The indicator of claim 76, wherein the course limiter is located inside the second compartment.

79. The indicator of claim 60, further comprising a hole in the closed end of the tube, the hole al air to flow into the tube as the moveable piston moves axially inside the tube.

80. The indicator of claim 60, further comprising at least one additive mixed with the freezable fluid, wherein the said additive comprising a gel, salts, fluid freezing modifiers and fluid thawing modifiers.

81. The indicator of claim 60, further comprising a granulated solid material mixed with the freezable fluid, wherein the granulated solid material promotes nucleation of the freezable fluid.

82. The indicator of claim 60, further comprising an additive mixed with the freezable fluid, wherein the said additive comprising dye, pigment and coloring material.

83. The indicator of claim 60, further comprising spaced marks on the tube.

84. A method for monitoring frozen goods, comprising a temperature sensitive indicator within the vicinity of a frozen good to be monitored, the indicator comprising a tube that comprises a first open end and a second closed end, an axially movable slidable piston to be assembled inside the tube forming a first compartment and a second compartment, a compressible means located inside the first compartment of the tube, a freezable fluid located in the second compartment of the tube and a releasable cap to cover the first open end of the tube;

wherein the method for monitoring frozen goods comprises the steps of
(i) placing the temperature sensitive indicator close to the frozen good;
(ii) activating the indicator by the frost action of the freezable fluid inside the second compartment and releasing the releasable cap;
(iii) when the environmental temperature increases, forcing the thaw thawed or thawing fluid to flow out of the tube, through a force exerted by the compressible means.

85. The method of claim 84, wherein placing the indicator within the vicinity of a frozen good comprises placing at least one indicator at a location relative to the frozen good, wherein the location is se from the group consisting of placing at least one indicator on the outside of the frozen good, placing the at least one indicator in the frozen good, and placing the at least one indicator in a blister pack with the frozen good.

* * * * *